United States Patent [19]

Wilkins

[11] Patent Number: 5,900,546
[45] Date of Patent: May 4, 1999

[54] LIQUID LEVEL INDICATOR FOR STORAGE TANK

[75] Inventor: Larry C. Wilkins, New Albany, Ind.

[73] Assignee: Electromechanical Research Laboratories, Inc., New Albany, Ind.

[21] Appl. No.: 08/899,559

[22] Filed: Jul. 24, 1997

[51] Int. Cl.$^6$ ...................................... G01F 23/28
[52] U.S. Cl. .................. 73/290 V; 73/319; 73/322.5; 340/624
[58] Field of Search .................. 73/290 V, 305, 73/309, 314, 319, DIG. 5, 322.5; 340/623, 624; 367/908; 181/124, 402

[56] References Cited

U.S. PATENT DOCUMENTS

| | | | |
|---|---|---|---|
| 4,063,457 | 12/1977 | Zekulin et al. | 73/290 V |
| 4,815,323 | 3/1989 | Ellinger et al. | 73/290 V |
| 4,984,449 | 1/1991 | Caldwell | 73/290 V |
| 5,054,319 | 10/1991 | Fling | 73/319 |
| 5,076,101 | 12/1991 | Lazure | 73/319 |
| 5,095,748 | 3/1992 | Gregory et al. | 73/290 V |
| 5,127,266 | 7/1992 | Maresca et al. | 73/290 V |
| 5,131,271 | 7/1992 | Haynes et al. | 73/290 V |
| 5,319,973 | 6/1994 | Crayton et al. | 73/290 V |

*Primary Examiner*—Diego F. F. Gutierrez
*Assistant Examiner*—Andrew Hirshfeld
*Attorney, Agent, or Firm*—Woodard, Emhardt, Naughton Moriarty & McNett

[57] ABSTRACT

A railroad tank car containing liquid, has a tube through its top, with the closed lower end of the tube in the liquid. A float slidable along the tube exterior is magnetically coupled to an ultrasound reflector piston inside the tube so that, when the tube is in the liquid in the tank, the float determines the height of the piston inside the tube. An ultrasonic transducer atop the tube sends pulses down the tube and which are reflected by the piston to the transducer. A computer coupled to the transducer determines and displays the liquid level. The piston is cup-shaped with a known distance between reflecting surfaces for use in the computer to produce a display value corrected for temperature variations.

14 Claims, 4 Drawing Sheets

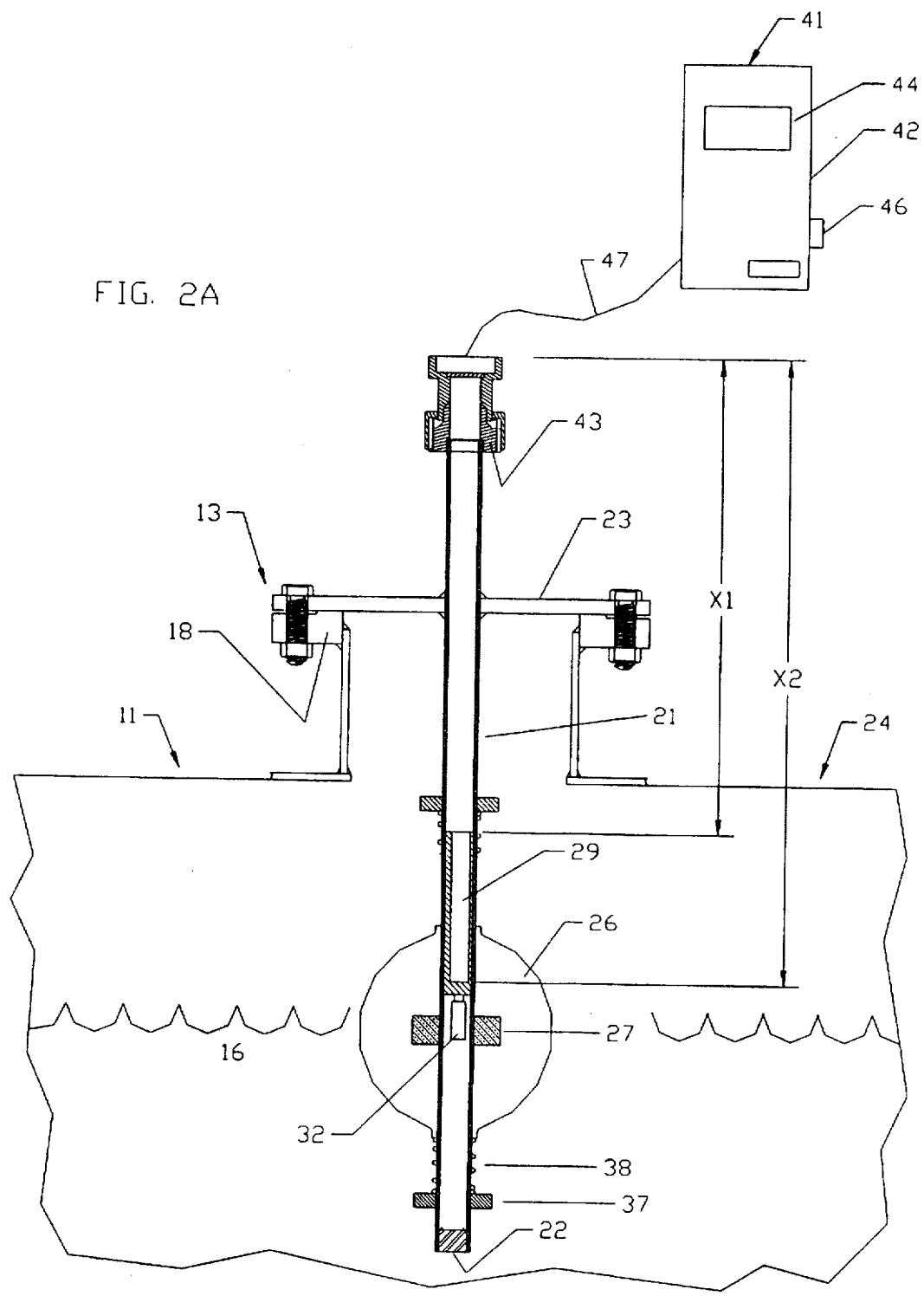

LIQUID LEVEL INDICATOR FOR STORAGE TANK

BACKGROUND OF THE INVENTION

1. Field of the Invention

This invention relates generally to liquid storage tanks, and more particularly to a device for accurately determining, from the top of the tank, the level of the liquid in the tank.

2. Description of the Prior Art

In businesses whose activities include storage of liquids in some kind of tank, it is at least of interest, and usually necessary, to have some means to determine the level of the liquid in a tank. A rudimentary means used in some cases is a sight glass in the wall or connected to the wall of the tank. In other cases, where access to the side of a tank is impossible, or inconvenient or impractical, a measuring stick is inserted through an opening in the top of the tank to measure the liquid level. The stick may be inserted to the bottom of the tank and then withdrawn, to note how much of the stick has the liquid on it. The stick may or may not be graduated. A more recent and refined approach is to insert into the liquid, a tube having a closed lower end, a graduated stem inside the tube, a float encircling the tube and having a magnetic coupling to an armature at the bottom of the stem. When the assembly is mounted to a top opening in a tank, the float will cause the measuring stem to settle at a level controlled by the float and whereby measurements on the stem, relative to the tube top, indicate the liquid level.

Ultrasonic ranging is well known for measuring distances. However, it is significantly affected by air movement and temperature changes. Therefore, to my knowledge, it has not been useful to detect the level of liquid in a tank in which there is any air movement, or a temperature variation due to depth or ambient conditions. A classic example of such environment is a railroad tank car. But it has remained important to be able to accurately determine the level of liquid in a tank car through a top access opening and in a convenient way. The present invention is addressed to this need.

SUMMARY OF THE INVENTION

Described briefly, accordingly to a typical embodiment of the present invention, a tube having a closed lower end has a mounting flange fixed near the upper end bolted or welded to the top of the tank. A float is slidable along the tube exterior and guided thereby. A piston inside the tube is magnetically coupled to the float so that the float will determine the elevation of the piston inside the tube.

A radiation pulse generator/receiver assembly is mounted atop the tube and sends pulses of radiant energy down the tube and which are reflected by the piston up to a receiver in the generator/receiver assembly. A computer chip inside the assembly atop the tube measures the time between the transmission of a pulse and the reception of pulse echoes to determine the distance between the piston and a reference mark on the reference piece and produce a reading on an indicator. The piston has a particular shape with a known distance between reflecting surfaces and which is used in the computer for a reference and applied to the liquid level indicating data to produce an output corrected for temperature variations.

BRIEF DESCRIPTION OF THE DRAWINGS

FIG. 2A is an enlarged fragmentary sectional view of a portion of the tank car with the device of the present invention installed on it where the transducer is mounted to the tank car and connected by a cable to the electronics box.

DESCRIPTION OF THE PREFERRED EMBODIMENT

Figure 1:
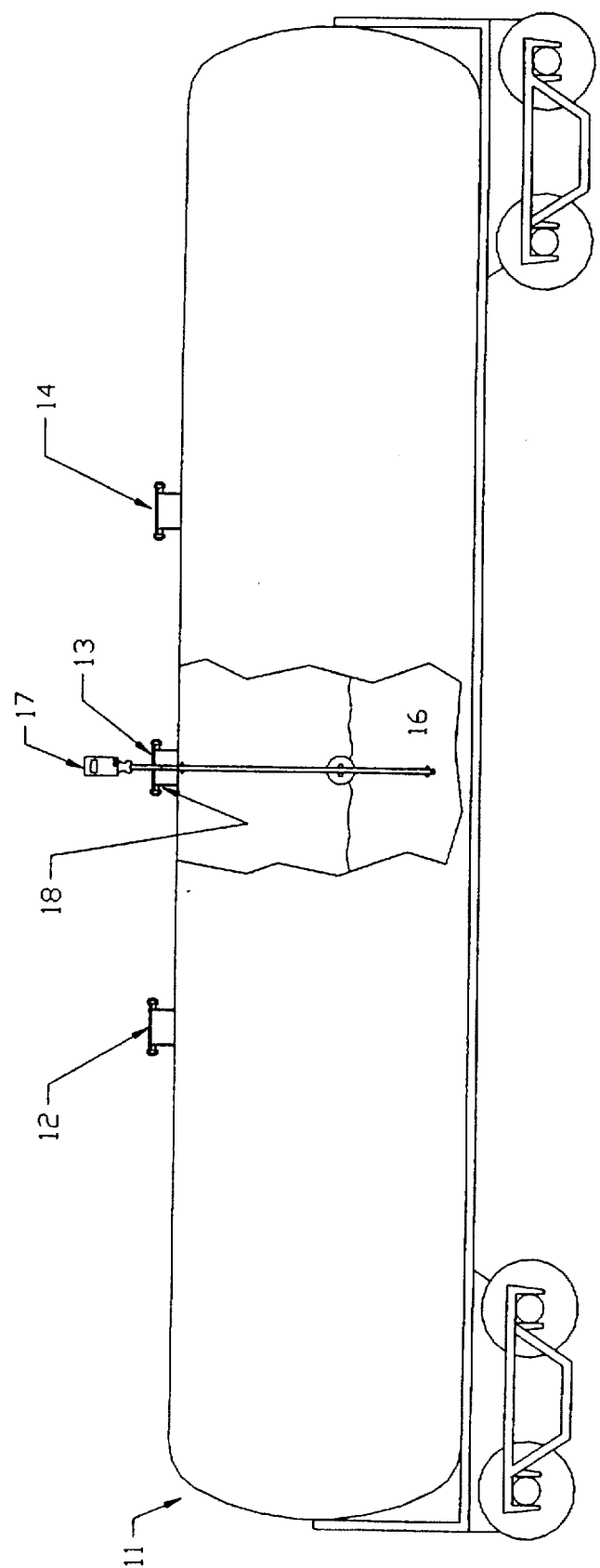
FIG. 1 is a schematical illustration of a railroad tank car with the device of the present invention in use in it.

Referring now to the drawings in detail, FIG. 1 shows a railroad tank car 11 having three access hatches 12, 13 and 14. Tank cars are known to have a variety of hatch or port arrangements therein, particularly in the top, and of various configurations and purposes. For present purposes of illustration, it can be considered that each of the hatches communicates with a separate tank within the car. To measure the level of the liquid 16 in the center tank, the device 17 of the present invention is attached to the hatch 13.

Figure 2:
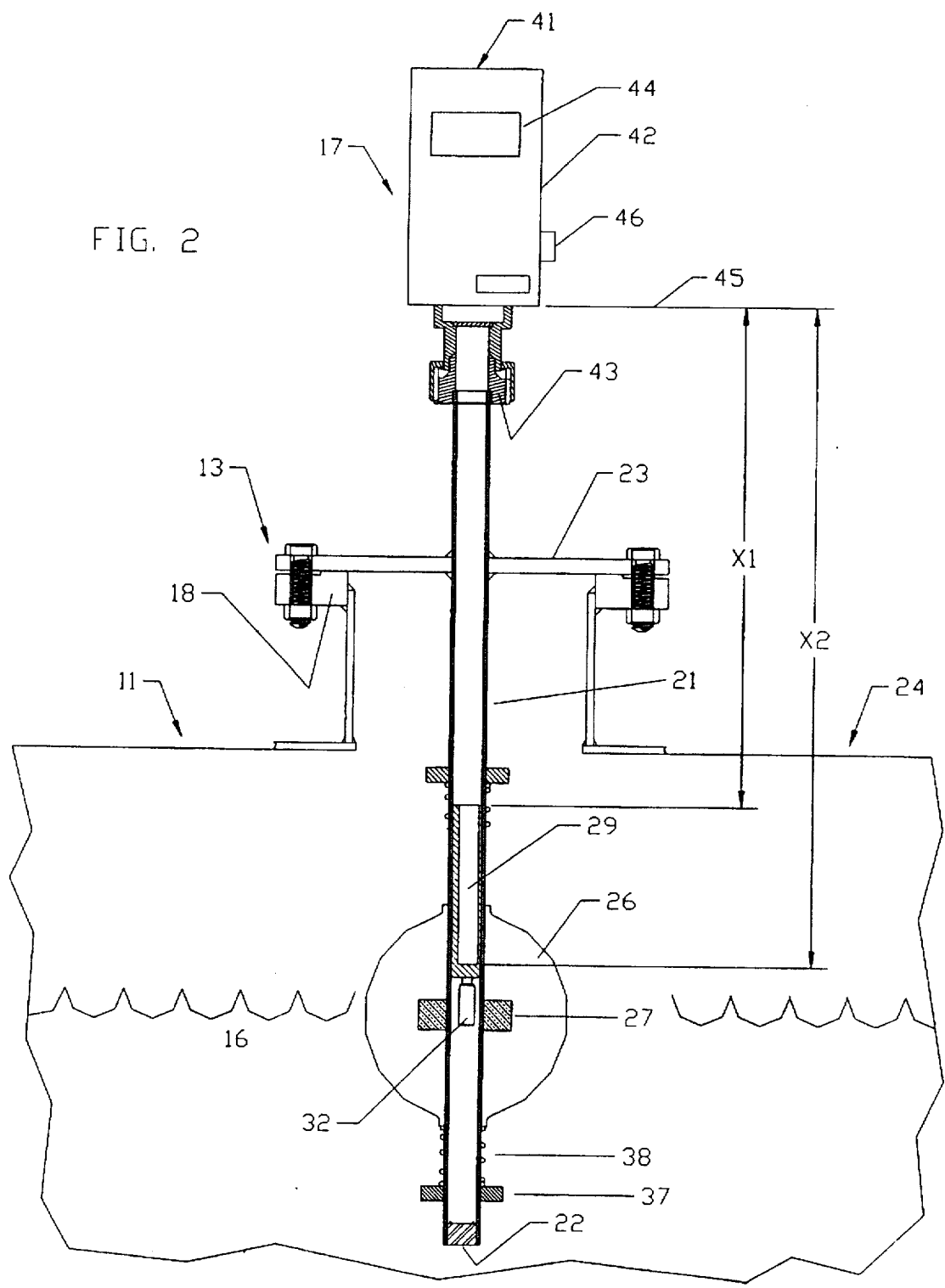
FIG. 2 is an enlarged fragmentary sectional view of a portion of the tank car with the device of the present invention installed on it.
Figure 3:
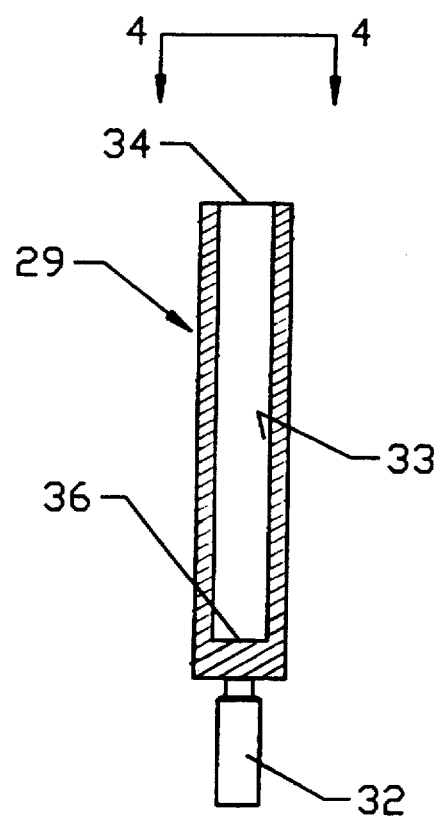
FIG. 3 is a further enlarged longitudinal sectional view of the reflector piston.

Referring to FIG. 2, in order to best use the space available for illustration, the parts are not necessarily drawn to scale, as will be most evident in the case of the tube 21 which is shown much shorter than would be the case in an actual installation. The measurement apparatus 17 includes the tube 21 of circular cross section and closed at the bottom 22 and welded to a disk-shaped mounting plate 23 bolted and sealed to the hatch flange 18. A horizontal plane tangent to the top of the tank, and referred to as plane 24 herein, can be considered a depth reference plane.

A float 26 is slidingly received on the tube 21. It is typically torous-shaped and has a torous shaped magnet 27 fixed in it.

A piston 29 is located inside the tube 21, freely slidable therein and has a magnet 32 fixed to the bottom and which is magnetically coupled to the magnet 27 in the float. Therefore, the piston and float remain magnetically locked in a fixed, radially-spaced relationship and in a fixed axial relationship so that they can and will move precisely in synchronism axially along the tube 21.

Figure 4:
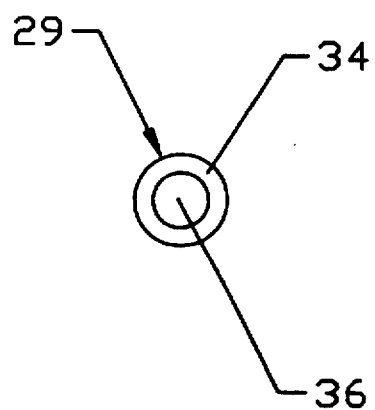
FIG. 4 is an end view thereof taken at line 4—4 in FIG. 3 and viewed in the direction of the arrows.

Piston 29 is cylindrical as evident in FIG. 4. In the illustrated embodiment, it has a cylindrical, closed-end bore 33 therein, open at the top. The top of the piston provides a flat, circular, ring-shaped surface 34 at a known distance from the flat circular bottom surface 36 of the bore. This feature of the present invention provides pulse reflecting surfaces at a known distance (x2–x1) apart to provide signal reflections that are relatively noise-free, readily distinguishable, and which are useful to establish a temperature correction factor for the depth measurement data obtained.

An ultrasonic transceiver assembly 41 includes the electronics box 42 with a conventional computer inside. The box has a quick-connect coupling affixed to the bottom thereof and which is received at mating coupling 43 on the tube 21. The transceiver assembly has a digital data display window 44. The transceiver assembly is self-contained, having a battery power supply, a transducer assembly at a level 45, for example, in the box to serve on a time-shared basis as an ultrasonic pulse transmitter and an ultrasonic echo receiver, with switches and associated circuitry, such as is known in the art and need not be detailed herein. An RS232 port 46 is provided on the box for downloading stored data into a personal computer, if desired.

A collar 37 is secured to the tube 21, and a cushion spring 38 between the collar and the bottom of the float 26 prevents the float from sliding off the tube during initial installation of the tube into the tank. They also prevent the float from sliding off during emptying of liquid contents from the tank. A similar collar and cushion spring can be mounted to the tube 21 at any desired height above the float to prevent damage to the float in the unlikely event of over-filling the tank.

In application of the apparatus, and depending upon the anticipated depth of the tank, and the range of liquid level of interest, the overall tube length would be established for the particular customer usage sites and interests. As the tank is filled the float will rise to the liquid surface, and the piston will correspondingly rise to the surface level of the liquid. It is convenient if the plane of the bottom 36 of the piston is at the liquid surface level for reference purposes, although the plane of the top 34, at whatever level it is relative to the surface level, may be used if desired. The choice is made at the time of matching the piston with the float during the manufacture of the apparatus.

After the electronics box is securely installed on the quick-connect fitting of the tube, it is turned on. The pulse rate is established so that echoes can be received from the two reflecting surfaces 34 and 36 of the piston between the times of transmission of pulses from the transceiver. The computer analyzes the received signals, comparing those from the two reflecting surfaces with the known distance between those surfaces to establish the present actual velocity of sound in the air in the tube. The computer also uses the signal from a selected one or the other of the two reflecting surfaces, and uses it with the time requirement for transmission and reflection to determine the distance between the reference plane 24 and the level of liquid. It is able to do this accurately by using the velocity of sound in air, determined from comparison of the echoes indicating bore depth with the known bore depth. This produces a readout of the distance from reference plane 24 to the liquid level, which is automatically corrected for any temperature difference in the air column from the reference plane 24 to the piston. This has been done in tests of the present invention successfully in a range of 30 inches to 113 inches from the reference plane.

As examples, a pulse transmitter having a frequency capability of 25,000 Hz (cycles per second) to 100,000 Hz may be used. The invention has been practiced using 50,000 Hz. The pulse rate can be in a range from 0.02 to 6,000 cycles per minute. A rate of 600 cycles per minute has been found satisfactory.

The sequence of events in the actual depth measurement process is as follows:

1. Transmit pulse.
2. Blocking interval C1 (receiver disabled).
3. Receiver enabled after C1 (first echo received at time T1).
4. Receiver disabled again until time T1+C2.
5. Receiver enabled after T1+C2 (second echo received at time T2).
6. Calculate the speed of sound in the air in the tank.
7. Calculate the liquid level distance.

For purposes of calculation, the first referenced distance from the level 45 of the transducer to the top edge 34 of the piston is X1. The time from transmission to reception of first signal is T1. The distance from the reflecting bottom 36 of the piston cup is X2. The time for return of the echo from this surface corresponds to T2. As an example, the distance X2 −X1 equals 6 inches. The correction factor for the air temperature, UE is found in the formula (T2−T1) UE=X2−X1 =6 inches, for example. Therefore, $$UE = \frac{X2 - X1}{T2 - T1}.$$

To find the actual distance to surface X1, and using the value of UE calculated above, the distance X1=T1×UE.

In the FIGS. 2A embodiment of the invention, instead of having the electronics box secured to the top of the tube, the transducer assembly itself 51 is mounted by the quick-connect coupling at 43 to the top of the tube. But in this case, the electronics box 42 is connected to the transducer assembly by a cable 47 plugged into the transducer 51 and containing conductors to the transducer and to the computer inside the electronics box for appropriate display of the liquid level in the window 44.

The invention has been illustrated and described in detail in the drawings and foregoing description as applied to a railroad tank car, but it can be applied to tanks in other mobile situations such as tanker trucks and tank barges, for example, and it can be applied to tanks in stationary environments or sites. Therefore, the disclosure is to be considered as illustrative and not restrictive in character, it being understood that only the preferred embodiment has been shown and described and that all changes and modifications that come within the spirit of the invention are desired to be protected.

What is claimed is:

1. A liquid level measurement apparatus comprising:
   a tube immersible vertically in liquid in a tank, the tube having a lower end wall closed to prevent admission of the liquid into the tube;
   a float slidable vertically along the tube exterior;
   a piston slidable vertically along the tube interior;
   the float and piston having interacting features to cause the piston to be moved vertically in the tube by vertical movement of the float;
   a radiant energy pulse generator atop the tube and oriented to direct pulses of energy of a frequency in the range of about 25,000 Hz to 100,000 Hz downward in the tube to the piston, and at a pulse rate in a range of 0.02 to 6,000 cycles per minute; and
   the piston having first and second sound reflecting surfaces spaced apart a known distance vertically to direct said pulses to a receiver atop the tube wherein the pulses reflecting from each of the reflecting surfaces can be utilized jointly to determine the velocity of sound in air in the tube, wherein the piston includes an upwardly opening cup having an inside bottom surface and a tubular wall extending from the perimeter of the inside bottom surface, the second sound reflecting surface being the bottom surface; and the first sound reflecting surface being an upper edge of said tubular wall.

2. The apparatus of claim 1 and wherein:
   the generator is also the receiver atop the tube and receives energy in the frequency range of about 25,000 to 100,000 Hz reflected from the reflecting surfaces.

3. The apparatus of claim 1 and wherein:
   the float and piston are magnetically coupled together for precise simultaneous movement and positioning of the piston with the float.

4. The apparatus of claim 1 and further comprising:

a liquid holding tank with the tube mounted to the tank.

5. The apparatus of claim 4 and wherein:

the tank is in a railroad tank car.

6. The apparatus of claim 1 and wherein:

the piston is elongate, having a longitudinal axis; and the first sound reflecting surface is farther from the axis than is said second sound reflecting surface.

7. The apparatus of claim 1 and wherein:

the upwardly extending tubular wall of the cup has an inner surface which is cylindrical.

8. The apparatus of claim 7 and wherein:

the first sound reflecting surface is a flat circular ring surface and the second sound reflecting surface is a flat circular disk surface extending outward from a longitudinal axis of the piston to the wall.

9. A contained liquid level measurement system comprising:

a tank having an opening accessible from above the tank;

a tube immersed vertically into liquid in the tank, the tube having a lower end closed to prevent admission of the liquid into the tube;

a float slidable vertically along the tube exterior;

a piston slidable vertically along the tube interior;

the float and piston being coupled to cause the piston to be moved vertically in the tube by vertical movement of the float;

an ultrasonic signal transducer associated with the tube and oriented to direct pulses of energy downward in the tube to the piston;

the piston having first and second sound reflecting surfaces spaced apart a known distance vertically to direct said pulses to a receiver atop the tube wherein the pulses reflecting from each of the reflecting surfaces can be utilized jointly to determine the velocity of sound in air in the tube, wherein the piston includes an upwardly opening cup having an inside bottom surface and a tubular wall extending from the perimeter of the inside bottom surface, the second sound reflecting surface being the bottom surface; and the first sound reflecting surface being an upper edge of said tubular wall.

10. The apparatus of claim 9 and further comprising:

a computer coupled to the transducer and controlling the transducer for enabling the transducer to receive the energy reflected from the reflecting surfaces.

11. The apparatus of claim 10 and wherein:

the computer is programmed to respond to the period between the transmission of pulses and the reception of reflected energy to calculate the level of the liquid in the tank.

12. The apparatus of claim 9 wherein:

the piston is elongate, having a longitudinal axis; and the first sound reflecting surface is farther from the axis than is said second sound reflecting surface.

13. The apparatus of claim 9 and wherein:

the upwardly extending tubular wall of the cup has an inner surface which is cylindrical.

14. The apparatus of claim 13 and wherein:

the first sound reflecting surface is a flat circular ring surface and the second sound reflecting surface is a flat circular disk surface extending outward from a longitudinal axis of the piston to the wall.

* * * * *